United States Patent [19]

Huschka et al.

[11] 3,985,844

[45] Oct. 12, 1976

[54] PROCESS FOR THE PRODUCTION OF PRISMATIC GRAPHITE MOLDED ARTICLES FOR HIGH TEMPERATURE FUEL ELEMENTS

[75] Inventors: Hans Huschka, Grossauheim; Lothar Rachor, Kleinauheim; Milan Hrovat, Rodenbach; Willi Wolff, Kahl, all of Germany

[73] Assignee: Nukem G.m.b.H., Germany

[22] Filed: July 12, 1973

[21] Appl. No.: 378,610

[30] Foreign Application Priority Data

July 14, 1972  Germany.............................. 2234587

[52] U.S. Cl. ................................ 264/29.1; 264/71; 264/176 R; 423/445; 423/448
[51] Int. Cl.² ................................................ B29C 25/00
[58] Field of Search ............ 264/29, 154, 155, 156, 264/325, .5, 56, 71, 176 R; 423/445, 448

[56] References Cited
UNITED STATES PATENTS

| | | | |
|---|---|---|---|
| 3,213,163 | 10/1965 | Brite et al. | 264/.5 |
| 3,219,731 | 11/1965 | Etzel et al. | 264/29 |
| 3,274,068 | 9/1966 | Koutz et al. | 264/.5 |
| 3,291,870 | 12/1966 | Allison | 264/.5 |
| 3,499,066 | 3/1970 | Murray | 264/56 |
| 3,790,654 | 2/1974 | Bagley | 264/56 |

*Primary Examiner*—Lorenzo B. Hayes
*Attorney, Agent, or Firm*—Cushman, Darby & Cushman

[57] ABSTRACT

Prismatic graphite molded objects for high temperature fuel elements are prepared by producing the outer geometry and the holes for cooling channels and for receiving fuel and fertile materials in the formation of the carbon object.

11 Claims, 4 Drawing Figures

U.S. Patent  Oct 12, 1976  3,985,844
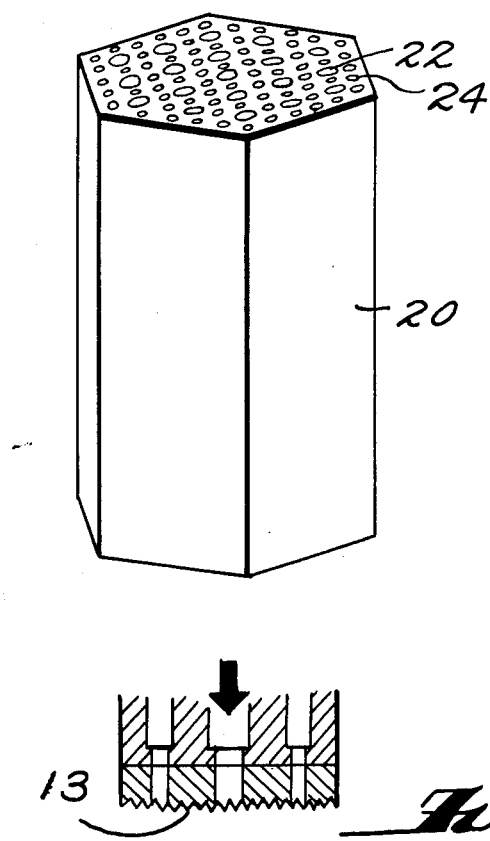
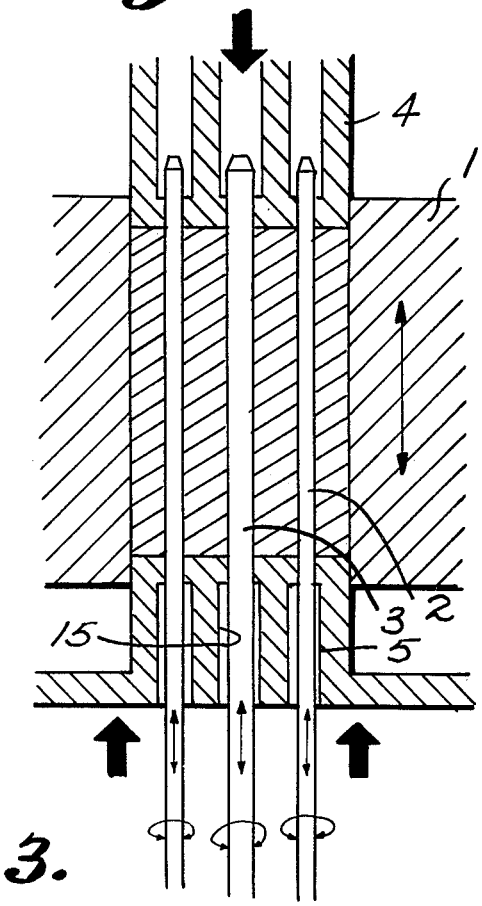
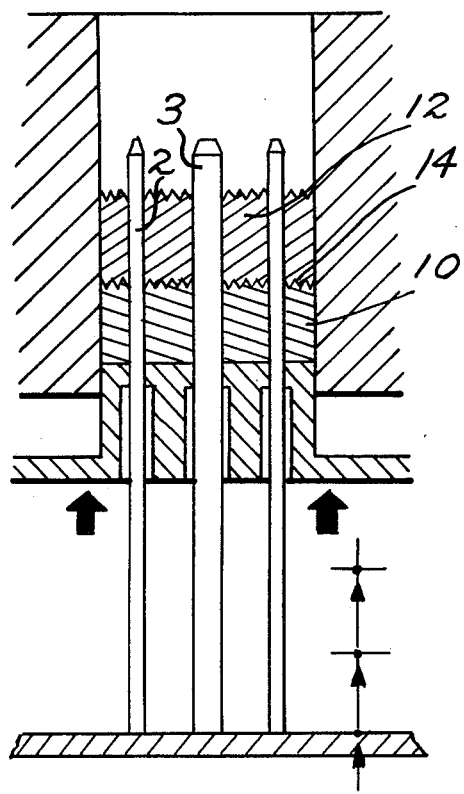
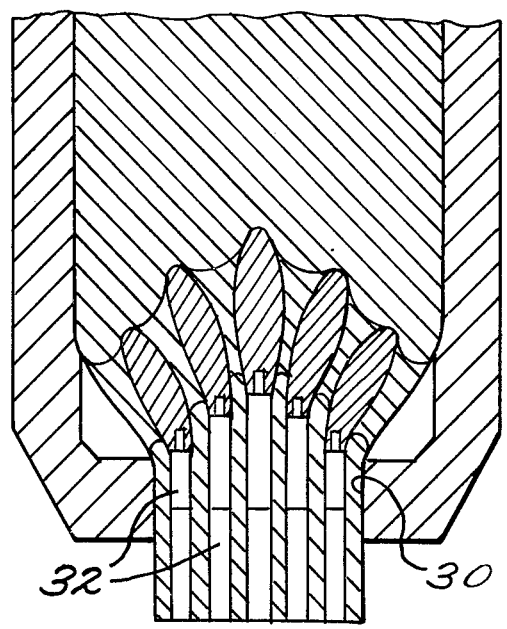

PROCESS FOR THE PRODUCTION OF PRISMATIC GRAPHITE MOLDED ARTICLES FOR HIGH TEMPERATURE FUEL ELEMENTS

Block shaped fuel elements are of great importance for gas cooled high temperature nuclear reactors.

Block fuel elements known until now are mechanically prefinished prisms of graphite, most being hexagonal in cross section, with a width over the hexagonal flats of about 400 and a length of about 1000 mm. which likewise contain in the hexagonal arrangement parallel to the prism axis bore holes (see FIG. 1). A part of the bore holes are filled with fuel rods containing coated particles and graphite matrix, the remaining part of the bore holes serves as cooling channels during operation of the reactor. Helium serves as the cooling agent.

The coated particles are granules of heavy metal oxides or carbides of several hundred $\mu$m diameter, which preferably are coated several times with pyrolytical deposited carbon. Uranium 235 and uranium 233 serve as fuels and thorium or uranium 238 serve as fertile material. The coatings have the task of retaining the fission products developing in the fuel granule.

The graphite body of the fuel element into which the fuel insert is introduced at the present time is produced by all graphite firms exclusively by molding large cylindrical graphite blocks which then must be finished mechanically. Thereupon, for example, there is milled from the cylinder a hexagonal prism, for example, in which are bored axial channels for the helium cooling and for the fuel inserts. While the milling of the prismatic surfaces is according to a conventional routine process, the boring of the channels while adhering to small tolerances for width and position is very expensive. Much work must be undergone and above all expensive machines are required. In spite of the great expense, it is not possible to avoid some drift away of bore holes which are only 10 – 20 mm. in diameter and 1000 mm. long. As a consequence thereof, the entrances of the cooling channels which are stacked on top of each other in the block fuel elements are somewhat displaced which results in raising the pressure drop of the helium cooling gas in the reactor core. This increased pressure drop results in greater work for the pump and thereby in higher operating costs. It is necessary in this connection to consider that in a 1000 million watt capacity reactor, as is projected for example by GGA (Gulf General Atomic Co., San Diego, Ca.), about 4000 blocks are inserted each of which has far over 100 bore holes.

In addition to this great mechanical complication, the graphite waste produced by machining plays a decisive role in the fuel element costs. It amounts to about 20% in shaping the cylinders to hexagonal prisms and in boring of channels about 40% of the volume of the prism. Altogether, by the machining there is a graphite waste of at least 50% weight of the initial amount.

The invention will be understood best in connection with the drawings wherein:

FIG. 1 shows a conventional hexagonal prism with bore holes parallel to the axis of the prism, FIG. 2 is a sectional view illustrating the method of forming graphite prisms according to the invention, FIG. 3 illustrates a preferred method of carrying out the invention; and FIG. 4 illustrates the formation of graphite objects according to the invention using an extruding process.

In the drawings, like numerals refer to like parts.

Referring more specifically to the drawings, FIG. 1 shows a conventional hexagonal prism 20 with numerous bore holes such as 22 and 24 parallel to the axis of the prism.

The present invention overcomes all of the difficulties mentioned above in preparing graphite bodies for high temperature reactors by developing a process for the fabrication of prismatic graphite molded blocks for high temperature fuel elements in which the outer geometry and the vacancies (channels) for fuel and fertile material and cooling already are produced in the formation of the carbon body as shown in FIG. 2. This is attained by producing the cavity in the die 1 in the geometry or shape desired for the molded object. The vacancies or channels are obtained by arranging prismatic displacement bodies such as indicated at 2 and 3, for example rods, in the desired positions parallel to the axis of the prism. The displacement bodies penetrate corresponding holes such as 15 in the punches 4 and 5 of the die. Because of friction of the molding compound on the surfaces, the presence of a large number of insertions results in observable gradations of pressure, density and accompanying properties from the front to the middle of the molded article. These difficulties can be overcome according to the invention by displacing the die matrix and/or the displacement bodies in a rotary, screwing or pushing movement relative to the stamping punches. Thereby the friction is decisively reduced.

A further possibility for producing property gradation free molded objects is in the selection of a small height of molded object. However, since a minimum block height is required for the reactor on several reasons the following method is used according to the invention. There is filled into the die cavity a part of the graphite molding compound needed for the entire block and this is compressed to the final density as shown by the mass 10 below the jagged line 14 which designates the seam with a subsequently compressed portion. The next part 12 of the molding compound is filled into the die cavity on the compressed first portion and densified. Additional filling and compressing steps are repeated until the desired height of the final molded object is reached. To avoid a discontinuity in the properties around the seam 14 there is provided according to the present invention a punch having the cross section 13. The seam thus has a greater area than if it were planar as can be seen from the saw toothed shape of the seam.

The boundary surface between two of the compressed parts corresponds therefore with the cross sectional surface area of the die. If a small amount of binder is additionally introduced to the boundary surface, for example, by thinly spraying an alcohol solution of a phenol-formaldehyde resin there is not found macroscopically any discontinuity in properties in the completed molded object in the seam area.

Graphite molded objects for high temperature fuel elements can also be made according to the present invention by extrusion presses as shown in FIG. 4 wherein the extrusion orifice 30 must contain the mandrels 32 for all of the vacancies in the molded objects.

Of especial interest, however, are the production of objects by a combination of extrusion presses and molding dies. As is generally known, graphite tends upon pressing to form a directed grain orientation. The orientation of the grain in molded bodies is perpendicular to the direction of pressing, in extrusion process, however, the orientation is parallel to the direction of pressing. If there is produced according to the present invention a shaped object by extrusion pressing with a lesser preliminary density of about 1.4 g/cm³ and this is subsequently compressed in a die cavity, as described above to a final density, there is obtained a molded object having a density of about 1.85 g/cm³ and a very good isotropy (anisotropy of thermal expansion of about 1.3 in the range 20 to 500° C.) In this two-step process, the density in the original extrusion can range from 1.0 to 1.5 g/cm³ and the final density should be at least 0.3 g/cm³ greater.

Finally, it must be mentiond for the compressing of the described molded objects the composition of the molding compound is of definite significance. All of the compressing processes described herein are carried out at temperatures which are over the softening point of the binding agent. At these temperatures, the molding compound must exhibit good flow properties and good compressibility. Also the molded objects must possess a good stability in the expulsion and coking.

Unless otherwise indicated, all parts and percentages are by weight.

EXAMPLE 1

A mixture of 80% petroleum code and 20% phenolformaldehyde resin was compacted in a molding die cavity in the production of a graphite block having a diameter of about 240 mm and a height of about 360 mm. The molding die with internal diameter of 240 mm was heated from outside (heat power 3 kilowatts) and 73 rod shaped displacement bodies. 18 of these rods had a diameter of 26.0 mm. and were provided for the introduction of fuel inserts. These were distributed uniformly over the cross section of the block. The remaining 54 displacment bodies having a diameter of 12.2 mm. were arranged hexagonally around these rods for cooling channels. Both the matrix and the inner die were movable in the axial direction.

The mixture was heated to 150° C in the molding tool and using a force of 45 metric tons corresponding to a pressure of 130 kgf/cm² (kilograms force/sq.cm.) compressed to a green density of 1.85g/cm³. After pushing out the molded article, the displacement bodies were withdrawn. To carbonize the resin binder, the molded article was heated to 800° C in a nitrogen atmosphere and subsequently graphitized at 2800° C. The properties of the block are set forth in Table 1.

EXAMPLE 2

There is set forth below the production of a graphite block combined extrusion and molding die method.

A mixture of petroleum coke (80% by weight) and thermoplastic binder resin, specifically phenolformaldehyde resin (20% by weight) were pressed vertically in an extrusion press at 150° C. The extrusion pressure was 100 kgf/cm². The extrusion press nozzle had an opening 195 mm. in diameter, in which there were inserted 36 displacement bodies. They were mounted on a central streamlined shaped insert and clipped over streamlined braces.

Nine of the 36 displacement bodies had a diameter of 26 mm. They were uniformly distributed over the cross section and produced the vacancies for the fuel inserts. The additional 27 bodies forming the cooling channels and having a diameter of 12 mm. were arranged hexagonally around the 9 displacement bodies for the fuel inserts. After cooling to 110° C the extruded rods were divided into pieces 250 mm. long. The bulk density of the carbon matrix was 1.50 g/cm³.

In the second step, the preliminarily extruded block was inserted into a molding die. The arrangement of the displacement bodies corresponded to the preliminarily presses channels. The inner diameter of the matrix was 200 mm. The 9 displacement rods for the formation of the fuel channels had a diameter of 25.5 mm., the remaining 27 rods had a diameter of 11.5 mm. The molding was carried out at 150° C with a force of 35 metric tons corresponding to 150 kgf/cm² pressure, to a green compressed density of 1.83 g/cm³. After cooling to 110° C, the block was pushed out of the mold and the displacement bodies withdrawn. In order to carbonize the binder resin, the block was slowly heated to 850° C in a nitrogen atmosphere and finally graphitized at 2800° C.

The properties of the block are set forth in Table 1.

TABLE 1

| PROPERTIES OF COMPRESSED GRAPHITE BLOCKS AFTER THE TEMPERATURE TREATMENT | | Block Pressed According to Example 1 | Block Pressed According to Example 2 |
|---|---|---|---|
| Dimensions (mm) | | | |
| Outer diameter | | 235.3±0.2 | 198.2±0.2 |
| Fuel channel diameter | | 25.8±0.1 | 25.3±0.1 |
| Cooling channel diameter | | 12.1±0.1 | 11.4±0.07 |
| Height | | 359.6±0.2 | 199.3±0.2 |
| Density (g/cm³) | | 1.69 | 1.72 |
| Heat conductivity | axial | 0.16 | 0.14 |
| (20°C (Cal/°C.cm.s.) | radial | 0.10 | 0.13 |
| Specific electric resistance | axial | $1.17\times10^{-3}$ | $1.64\times10^{-3}$ |
| (Ω.cm) | radial | $2.97\times10^{-3}$ | $1.44\times10^{-3}$ |
| Linear thermal expansion | axial | $4.2\times10^{-6}$ | $3.9\times10^{-6}$ |
| (1/°C) | radial | $1.75\times10^{-6}$ | $2.9\times10^{-6}$ |
| Anisotrophy factor for thermal expansion | | 2.4 | 1.3 |
| Flexural strength | axial | 354 | 172 |
| (kgf/cm²) | radial | 170 | 135 |
| E-Modules (kgf/cm²) | axial | $16.4\times10^{4}$ | $5.6\times10^{4}$ |
| | radial | $13.1\times10^{4}$ | $3.9\times10^{4}$ |
| Compressive strength | axial | 533 | 380 |
| (kgf/cm²) | radial | 312 | 326 |

The graphitization step can be carried out at any conventional graphitization temperature.

In place of the phenol-formaldehyde resin, there can be used any other synthetic resin conventionally employed as a binder in making graphite bodies suitable for use in high temperature fuel elements, for example furfuryl alcohol resins or mixtures of phenole formaldehyde resins and furfuryl alcohol resins or mixtures of resins and pitch.

What is claimed is:

1. In a process for the fabrication of prismatic graphite molded bodies for high temperature reactors by molding a binder containing carbonaceous pressing mass in a molding die having stamping punches for compressing the mass and heating the molded article and wherein the cavity of the molding die has the outer geometry of the prismatic body to be formed and wherein vacancies for cooling channels and for the reception of fuel and breeder particles are made by providing prismatic displacement bodies in said mass having the dimensions of said cooling channels and said vacancies for fuel and breeder materials the improvement comprising axially moving at least one of (a) said die, and (b) said displacement bodies relative to the stamping punches, during the molding with attendant lowering of the friction between the molding mass and the stamping punches.

2. A process according to claim 1, wherein the heat during the pressing temperature is supplied by externally heating the molding die.

3. A process according to claim 1 wherein the binder is a phenol-formaldehyde.

4. In a process for the fabrication of prismatic graphite molded bodies for high temperature reactors by molding a binder containing carbonaceous pressing mass in a molding die having stamping punches for compressing the mass and heating the molded article and wherein the cavity of the molding die has the outer geometry of the prismatic body to be formed and wherein vacancies for cooling channels and for the reception of fuel and breeder particles are made by providing prismatic displacement bodies in said mass having the dimensions of said cooling channels and said vacancies for fuel and breeder materials the improvement comprising partially forming said prismatic body by extrusion and axially moving at least one of (a) said die, and (b) said displacement bodies relative to the stamping punches, during the molding with attendant lowering of the friction between the molding mass and the stamping punches.

5. A process according to claim 4 comprising preliminarily shaping the prismatic graphite bodies by extrusion and thereafter completing the densification by the use of said molding die.

6. In a process for the fabrication of prismatic graphite molded bodies for high temperature reactors by molding a binder containing carbonaceous pressing mass in a molding die having stamping punches for compressing the mass and heating the molded article and wherein the cavity of the molding die has the outer geometry of the prismatic body to be formed and wherein vacancies for cooling channels and for the reception of fuel and breeder particles are made by providing prismatic displacement bodies in said mass having the dimensions of said cooling channels and said vacancies for fuel and breeder materials the improvement comprising axially moving at least one of (a) said die, and (b) said displacement bodies relative to the stamping punches, during the molding with attendant lowering of the friction between the molding mass and the stamping punches, said molding being carried out by first placing only a portion of the molding mass into the die cavity, densifying said portion by pressing and thereafter placing a second portion of the molding mass into the die cavity in juxtaposition to the first portion and densifying said second portion by pressing and repeating the process until all of the molding mass is placed in the die cavity and compressed.

7. A process according to claim 6 wherein the second portion is placed on top of the first portion.

8. A process according to claim 6 comprising forming a nonplanar seam between the first and second portion of the molding composition to provide a greater area of seam by employing a molding die having a nonplanar surface to increase the cross section thereof.

9. A process according to claim 8 including the step of applying an additional amount of binder to the exposed surface of the compressed first portion before applying and compressing the second portion.

10. In a process for the fabrication of prismatic graphite molded bodies for high temperature reactors by molding a binder containing carbonaceous pressing mass in a molding die having stamping punches for compressing the mass and heating the molded article and wherein the cavity of the molding die has the outer geometry of the prismatic body to be formed and wherein vacancies for cooling channels and for the reception of fuel and breeder particles are made by providing prismatic displacement bodies in said mass having the dimensions of said cooling channels and said vacancies for fuel and breeder materials the improvement comprising axially moving at least one of (a) said die, and (b) said displacement bodies relative to the stamping punches, during the molding with attendant lowering of the friction between the molding mass and the stamping punches and also setting said displacement bodies in a rotary motion relative to the axis of the stamping punches.

11. In a process for the fabrication of prismatic graphite molded bodies for high temperature reactors by molding a binder containing carbonaceous pressing mass in a molding die having stamping punches for compressing the mass and heating the molded article and wherein the cavity of the molding die has the outer geometry of the prismatic body to be formed and wherein vacancies for cooling channels and for the reception of fuel and breeder particles are made by providing prismatic displacement bodies in said mass having the dimensions of said cooling channels and said vacancies for fuel and breeder materials the improvement comprising axially moving at least one of (a) said die, and (b) said displacement bodies relative to the stamping punches, during the molding with attendant lowering of the friction between the molding mass and the stamping punches and also setting the displacement bodies in a screwing motion relative to the axis of the stamping punches.

* * * * *